United States Patent [19]
Imai

[11] 4,236,439
[45] Dec. 2, 1980

[54] LOCKABLE PIN

[75] Inventor: Kishio Imai, Itami, Japan

[73] Assignee: Sanyo Kiki Kabushiki Kaisha, Itami, Japan

[21] Appl. No.: 932,764

[22] Filed: Aug. 11, 1978

[30] Foreign Application Priority Data

Aug. 11, 1977 [JP] Japan .................................. 52-96666
Aug. 11, 1977 [JP] Japan .................................. 52-96667

[51] Int. Cl.² ........................................................ F16B 19/00
[52] U.S. Cl. .................................... 85/5 CP; 403/324; 403/379
[58] Field of Search ................ 85/8.1, 8.3, 5 CP, 5 N; 280/515; 403/324, 316, 317, 379, 349; 24/201 LP

[56] References Cited
U.S. PATENT DOCUMENTS

| 148,421 | 3/1874 | Dance | 85/5 CP |
| 2,158,116 | 5/1939 | Graham | 403/316 X |
| 2,759,388 | 8/1956 | Annis | 85/8.3 |
| 2,856,806 | 10/1958 | Gibbons, Jr. | 85/5 CP |
| 3,926,089 | 12/1975 | Ruebig | 85/8.3 X |
| 3,963,361 | 6/1976 | Schenk | 403/349 X |

Primary Examiner—Andrew V. Kundrat
Attorney, Agent, or Firm—Armstrong, Nikaido, Marmelstein & Kubovcik

[57] ABSTRACT

A lockable pin comprises a ring-like locking element which is cut at a place on the circumference to provide free ends at which it is pivotally attached to the pin body.

In use, the pin is inserted in a throughgoing hole formed in a shaft end and the locking element is brought into engagement with a recess formed in the front end of the pin body or with an annular groove formed in the shaft end. The locking element is firmly held in the recess or groove by the elasticity of the locking element itself or by an upward elastic force acting on the pin body.

1 Claim, 8 Drawing Figures

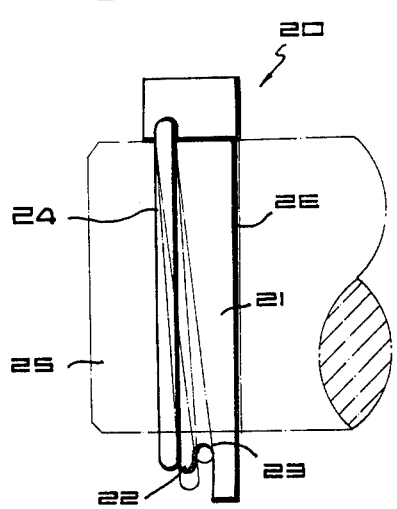
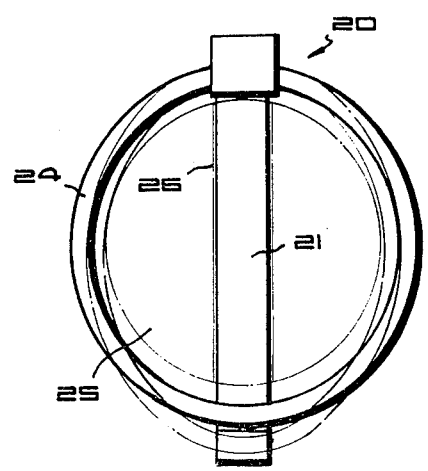
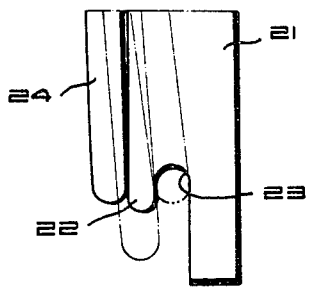
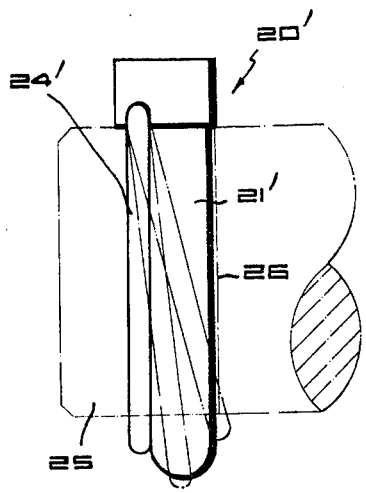
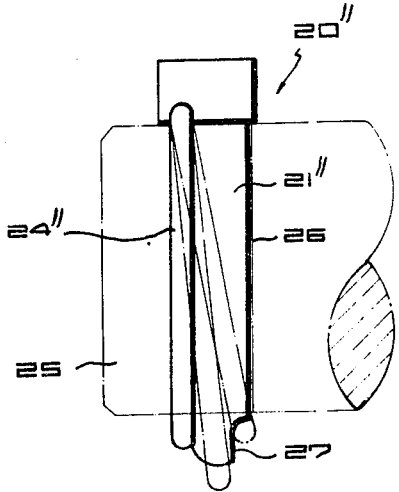

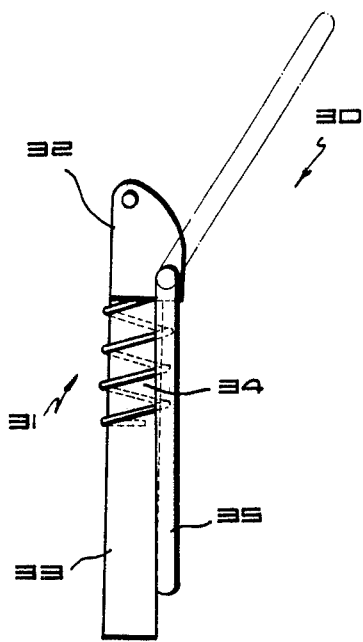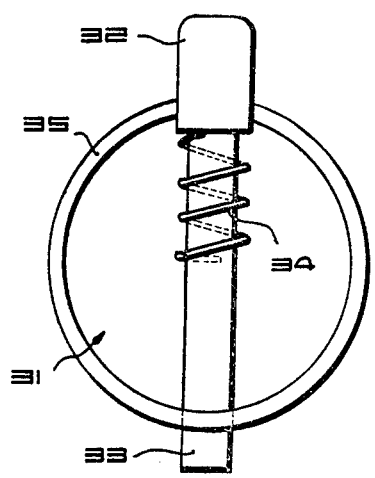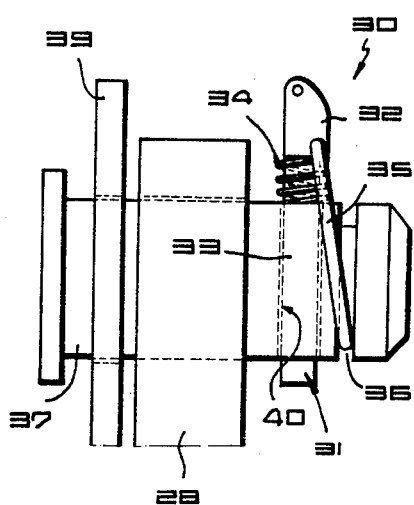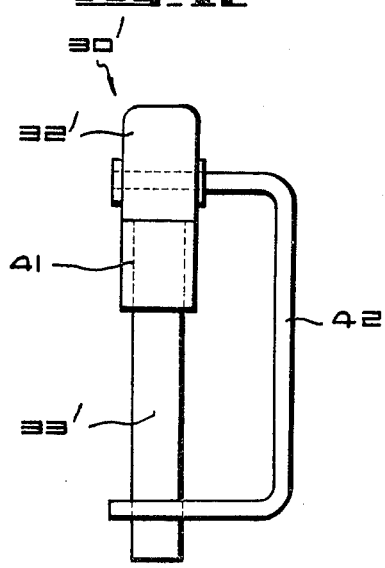

LOCKABLE PIN

BRIEF DESCRIPTION OF THE INVENTION (a) Field of the Invention

The present invention relates to a lockable pin with a locking element.

(b) Object of the Invention

The object of the invention is to prevent the lockable pin from slipping off from a throughgoing hole formed in a shaft in which it is inserted, in such a manner that the locking element pivotally attached to the upper end of the pin body is engaged with an annular groove formed in the front end of the pin body or in the shaft end by making use of the elasticity of the locking element or the recoiling force of an elastic member installed on the pin body, whereby the locking element is prevented from being disengaged from the engagement section during use when it is subjected to vibrations or external pushing forces.

(c) Description of the Prior Art

Generally, a lockable pin 1 is easy to handle and used in various fields. For example, it is used to prevent the slipping-off of the shaft 4 of the bucket 3 of a front loader 2, as shown in FIG. 1.

As for the means for preventing the slipping-off of this lockable pin 1 itself, as shown in FIGS. 2 and 3, a ring 6 is cut at a place on the circumference to provide free ends at which it is rotatably attached to the upper end of a pin body 5 in such a manner that the positions where said ends are attached are vertically and horizontally shifted from each other so that the ring 6 is in a twisted state producing a torque which is upwardly or downwardly directed with the neutral position shown in 2-dot and dash lines on an extension of the line which connects the centers of attaching holes 8 and 9 in FIG. 2. Thus, when the lockable pin 1 is to be inserted in a throughgoing hole, i.e., pin hole 7 formed in the shaft 4, the ring 6 is upwardly turned to a position shown in dot and dash lines in FIG. 2 and then the pin body 5 is inserted in the pin hole 7, whereupon the ring 6 is turned downwardly. More particularly, the ring 6 is turned from its dot and dash position in FIG. 2 to a position lying at right angles to the pin body 5 and, when further turned, it assumes a position on an extension of the line which connects the centers of the attaching holes 8 and 9 in which the ring ends are inserted. As soon as the ring 6 passes this position, a downward torque produced in the ring 6 causes it to turn downwardly until it comes in contact with the lower end of the pin body 5 and stops there, as shown in solid lines in FIG. 2. The final state of the ring is such that it is fitted on the shaft, firmly locking the lockable pin 1 in the shaft 4.

However, as the prevention of slipping-off of the lockable pin 1 relies solely on the elastic force of the ring 6, as described above, it often occurs that when the ring is struck or caught by something or subjected to vibrations, it is upwardly turned to its dot and dash position in FIG. 2, with the result that the lockable pin 1 slips off from the pin hole 7 and is lost.

SUMMARY OF THE INVENTION

According to the present invention, a ring-like locking element is cut at a place on the circumference to provide free ends at which it is pivotally attached to the upper end of the pin body. The pin body is then inserted in a throughgoing hole formed in a shaft at its end and said locking element is brought into engagement with a recess formed in the front end of the pin body or with an annular groove formed in the shaft end and is firmly held in said recess or annular groove by the elastic force of the locking element itself or by an upward elastic force acting on the pin body. In use, therefore, the locking element will not be accidentally disengaged from the recess or groove when it is subjected to vibrations or external forces, and hence the pin body will not slip off from the throughgoing hole. Further, by disengaging the locking element from the recess or groove against the elasticity, it is possible to pull out the pin body easily from the shaft end.

BRIEF DESCRIPTION OF THE DRAWINGS

FIG. 4 is a side view of a first embodiment of a lockable pin according to the present invention;

FIG. 5 is a front view thereof;

FIG. 6 is an enlarged view of the lower end of the lockable pin;

FIGS. 7 and 8 are view showing modifications of the first embodiment;

FIG. 9 is a side view of a second embodiment of the invention;

FIG. 10 is a front view thereof;

FIG. 11 is a view showing a use thereof; and

FIG. 12 is a view showing a modification of the second embodiment.

DESCRIPTION OF THE PREFERRED EMBODIMENTS

Figure 1:
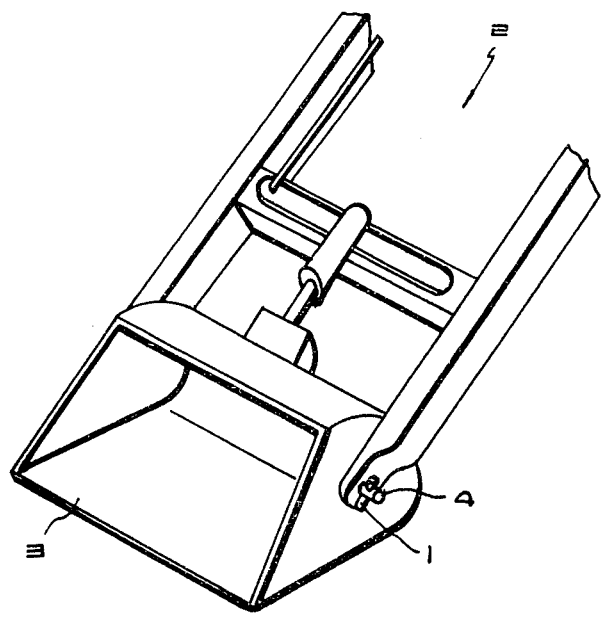
FIG. 1 is a perspective view showing an example of use of a lockable pin.
Figure 2:
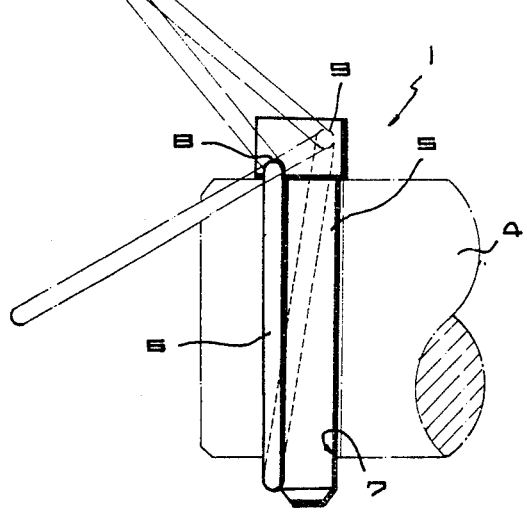
FIG. 2 is a side view of a known lockable pin.
Figure 3:
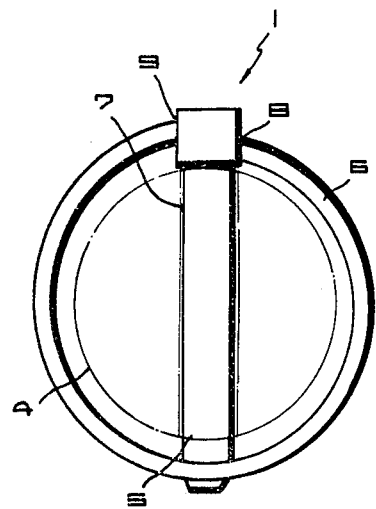
FIG. 3 is a front view of the lockable pin in FIG. 2.

Referring to FIGS. 4 and 5, the numeral 20 designates a lockable pin and 21 designates a pin body, the lower end of which is notched like a hook to provide a raised portion 22 and a recess 23, as shown in FIG. 6. The numeral 24 designates a ring-like locking element, i.e., a spring body 24, pivotally attached to the upper end of the pin body 21, said spring body being in the form of a ring and made of elastic material, such as a synthetic resin or rigid rubber. The size of said ring-like spring body 24 is such that when it is turned downwardly, its front end cannot clear the raised portion 22 formed at the lower end of the pin body. As for the attachment of the spring body 24 to the pin body 21, there is no need to shift the attaching positions as in the case of a conventional lockable pin with a ring-like locking element.

In the above arrangement, in order to prevent the slipping-off of a shaft 25 by the ring-attached pin 20 of the invention, first the spring body 24 of the ring-attached pin 20 is upwardly turned to insert the ring-attached pin 20 into a pin hole 26 formed in the shaft 25 and then the spring body 24 of the ring-attached pin 20 is downwardly turned until its front end comes in contact with the lateral wall of the raised portion 22 at the lower end of the pin body 21. In this condition, when the spring body 24 is squeezed, it is deformed into an oval shape, enabling the spring body 24 to be further turned to clear the front end of the raised portion 22 until the front end of the spring body 24 is positioned below the recess 23. When the squeezing pressure applied to the spring body 24 is removed, the spring body 24 tends to resume its original shape by the action of its own restoring force, so that the front end of the spring body 24 is fitted in the recess 23, thereby preventing the slipping-off of the ring-attached pin 20 from the pin hole 26 of the shaft 25. In addition, the above description refers to an example in which the attaching positions of the spring body 24 at the upper end of the pin body 21 are not shifted from each other, but it is also possible to pivotally attach the spring body to the pin body with the attaching positions shifted from each other, as in the case of the ring-attached pin shown in the conventional example described above, so as to prevent the slipping-off of the ring-attached pin by the recoiling force of the spring body as in the conventional example.

FIGS. 7 and 8 show modifications of the embodiment shown in FIG. 1. According to the modification shown in FIG. 7, the lower end of a pin body 21' is not specially shaped but the length of the pin body 21' is made somewhat longer than a spring body 24', so that after the ring-attached pin 20 is inserted in the pin hole 26 of the shaft 25, the spring body 24' is downwardly turned to bring the front end of the spring body 24' into contact with the lower end of the pin body 21' and the spring body 24' is then squeezed to be deformed to the extent that it can be further turned to clear the lower end of the pin body 24', whereupon the squeezing pressure on the spring body 24' is removed to restore the latter to its original shape, thereby preventing the spring body 24' from being upwardly turned when subjected to vibrations or external forces. According to the modification shown in FIG. 8, the lower end of a pin body 21" is provided with a step 27 on the side opposite to that described in the first embodiment, and after a spring body 24" is deformed so that it can be turned to clear the front end of the pin body over to the other side of the pin body 21", it is fitted in the step 27 formed on said other side.

In addition, the spring body used in the present invention has been described as being in the form of a ring in the above embodiments, but it may be of any other form, e.g., an L-shape, so long as the shaft can be held between the front end of the spring body and the upper end of the pin body.

FIGS. 9 through 11 show a second embodiment of the invention. The numeral 30 designates a ring-attached lockable pin; 31 designates a pin body comprising a head portion 32 and a stem portion 33; 34 designates a spring fitted on said stem portion 33 of the pin body 31, one end of said spring 34 being fixed to the upper end of the stem portion 33. The numeral 35 designates a ring pivotally attached to the head portion 32 of the lockable pin 30.

In the above arrangement, in order to prevent the slipping-off of a shaft and of the lockable pin 30 itself from a pin hole by using the lockable pin 30, two members 38 and 39 are first joined together by a shaft 37 having a recess 36 near its front end, as shown in FIG. 11. With the ring 35 of the lockable pin 30 turned upwardly, the lockable pin 30 of the present invention is then inserted in a pin hole 40 formed in the shaft 37 in the rear of the recess 36. In this condition, the lockable pin 30 is depressed while compressing the spring 34 and the ring 35 is turned downwardly until the front end of the ring 35 is positioned below the recess 36 of the shaft 37, and the squeezing pressure on the lockable pin 30 is removed. As a result, the lockable pin 30 is upwardly moved by the expansion of the spring 34 and the ring 35 is also upwardly moved until the front end of the ring 35 is fitted in the recess 36 of the shaft 37, thereby preventing the slipping-off of the shaft 37 and of the lockable pin 30 itself from the pin hole 40.

FIG. 12 shows another modification according to the invention, wherein a rubber piece 41 is used as the elastic body to be fitted on the stem portion 33' of a lockable pin 30', while a U-shaped locking element 42 is used instead of the ring-shaped locking element to be pivotally attached to the head portion 32' of the lockable pin 30'. This lockable pin is used in exactly the same manner as the second embodiment described above.

While there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A lockable pin comprising a pin body having a head portion fixedly connected to a stem portion at an upper portion thereof, said stem portion being insertable through a transverse bore formed in a shaft to be locked, an elastic member disposed around said stem portion and having one end thereof fixed to said upper portion of said stem portion of said pin body, and a locking element pivotally attached to said head portion, the arrangement being such that by depressing said pin body as a whole against the elastic force of said elastic member with said elastic member between said head portion and an outer peripheral surface of said shaft, the locking element is directly fitted in an annular groove formed in said shaft at its end.

* * * * *